(12) United States Patent
Welker

(10) Patent No.: US 6,827,486 B2
(45) Date of Patent: Dec. 7, 2004

(54) TEMPERATURE PROBE AND INSERTION DEVICE

(75) Inventor: Brian H. Welker, Sugar Land, TX (US)

(73) Assignee: Welker Engineering Company, Sugar Land, TX (US)

( * ) Notice: Subject to any disclaimer, the term of this patent is extended or adjusted under 35 U.S.C. 154(b) by 1 day.

(21) Appl. No.: 10/302,056

(22) Filed: Nov. 22, 2002

(65) Prior Publication Data

US 2004/0101025 A1 May 27, 2004

(51) Int. Cl.$^7$ .......................... G01K 1/14; G01K 13/02
(52) U.S. Cl. ...................... 374/147; 374/208; 374/148
(58) Field of Search ................. 374/141, 142, 374/147, 163, 208, 138, 148, 45

(56) References Cited

U.S. PATENT DOCUMENTS

| | | | | |
|---|---|---|---|---|
| 2,820,839 A | * | 1/1958 | Schunke | 136/231 |
| 3,459,041 A | * | 8/1969 | Hippen | 73/239 |
| 4,575,705 A | * | 3/1986 | Gotcher | 338/28 |
| 4,586,246 A | * | 5/1986 | Oskoui | 29/612 |
| 4,618,266 A | * | 10/1986 | Feller | 374/41 |
| 4,631,967 A | * | 12/1986 | Welker | 73/861.25 |
| 4,653,935 A | * | 3/1987 | Daily et al. | 374/208 |
| 5,022,766 A | * | 6/1991 | Phipps | 374/209 |
| 5,185,996 A | * | 2/1993 | Smith et al. | 60/772 |
| 5,199,493 A | * | 4/1993 | Sodder, Jr. | 166/297 |
| 5,423,610 A | * | 6/1995 | Stansfeld et al. | 374/179 |
| 5,662,418 A | * | 9/1997 | Deak et al. | 374/144 |
| 5,834,657 A | * | 11/1998 | Clawson | 73/863.81 |
| 6,023,969 A | * | 2/2000 | Feller | 73/204.25 |
| 6,059,463 A | * | 5/2000 | Althaus et al. | 385/92 |
| 6,089,110 A | * | 7/2000 | Pallotta et al. | 73/866.5 |
| 6,231,230 B1 | * | 5/2001 | Baldock et al. | 374/208 |
| 6,241,383 B1 | * | 6/2001 | Feller | 374/40 |
| 6,352,001 B1 | * | 3/2002 | Wickert et al. | 73/861.52 |
| 6,457,857 B1 | * | 10/2002 | Gul | 374/208 |
| 6,485,175 B1 | * | 11/2002 | Nimbereger et al. | 374/142 |
| 6,599,012 B2 | * | 7/2003 | Gul | 374/208 |
| 2002/0121301 A1 | * | 9/2002 | Devall | 137/202 |
| 2004/0123824 A1 | * | 7/2004 | Afjeh et al. | 123/90.11 |

OTHER PUBLICATIONS

ThermoSync Temperature Measurement System Advertisement; PGI International.
Welker On–Line Analyzer; Get the Most From You On–Line Analyzer; Welker Engineering Company Product Distribution Catalog; 2001; 1 pg.; Sugar Land, Texas, US.
Welker Automatic Insertion Devices; Welker Engineering Company Product Distrubution Catalog; 2001; 1 pg.; Sugar Land, Texas, US.
Welker Automatic Insertion Devices; AID Series; Welker Engineering Company Product Distribution Catalog; 2001; 2 pgs.; Sugar Land, Texas, US.
Welker Corrosion Coupon Automatic Insertion Device; Style AID–3CC; Welker Engineering Company Product Distribution Catalog; 2001; 1 pg.; Sugar Land, Texas, US.
Welker Automatic Insertion Temperature Probe; AITP–1 Series; Welker Engineering Company Product Distribution Catalog; 2001; 2 pgs.; Sugar Land, Texas, US.

* cited by examiner

Primary Examiner—Gail Verbitsky
(74) Attorney, Agent, or Firm—Blackwell Sanders Peper Martin LLP

(57) ABSTRACT

An automatic insertion device includes a temperature sensing element structured to provide direct contact between the fluid in a pipeline and the sensor or sensing element. A valve assembly is provided to seal the interior of the conduit from its exterior when the sensing element is in its retracted position.

13 Claims, 2 Drawing Sheets

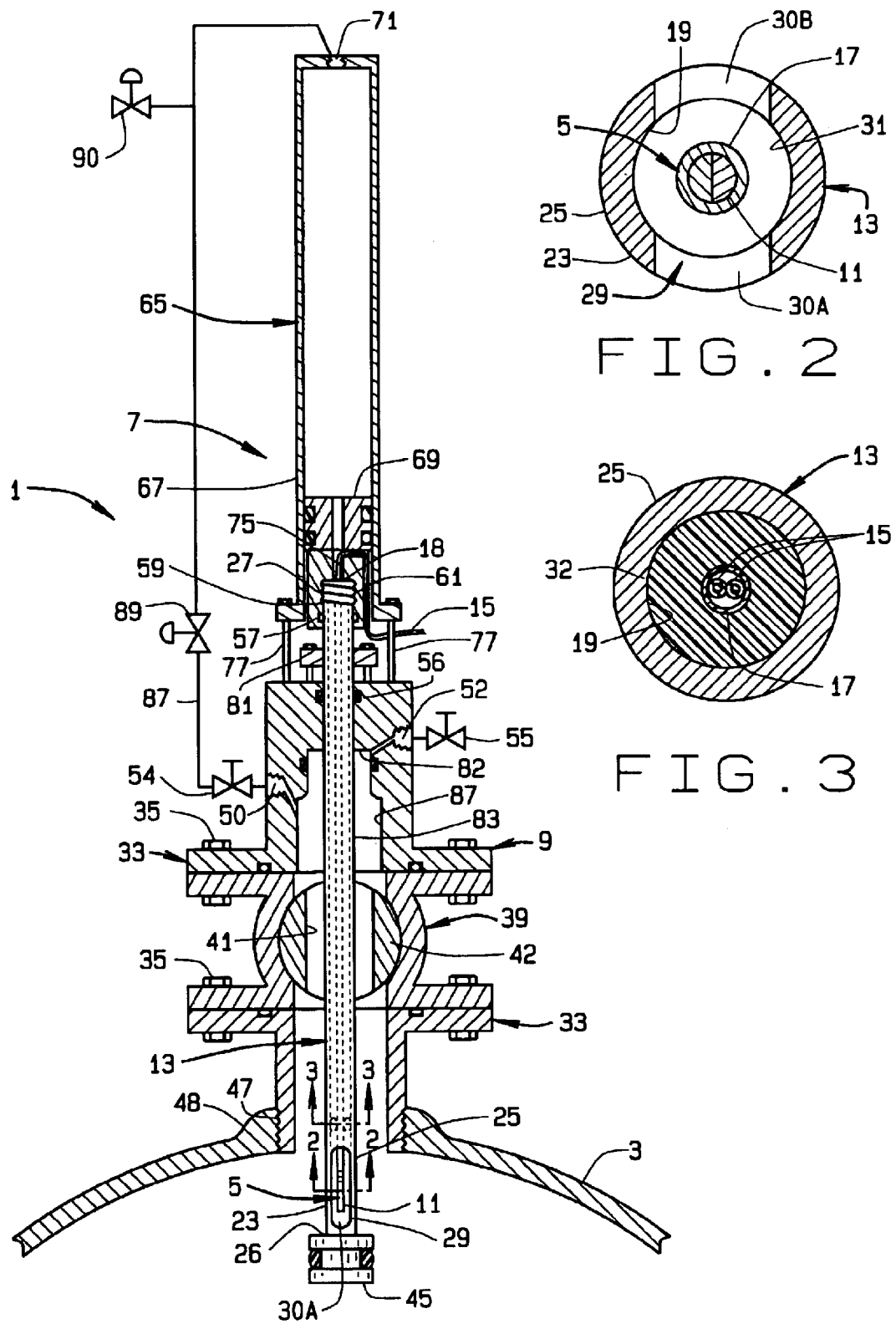

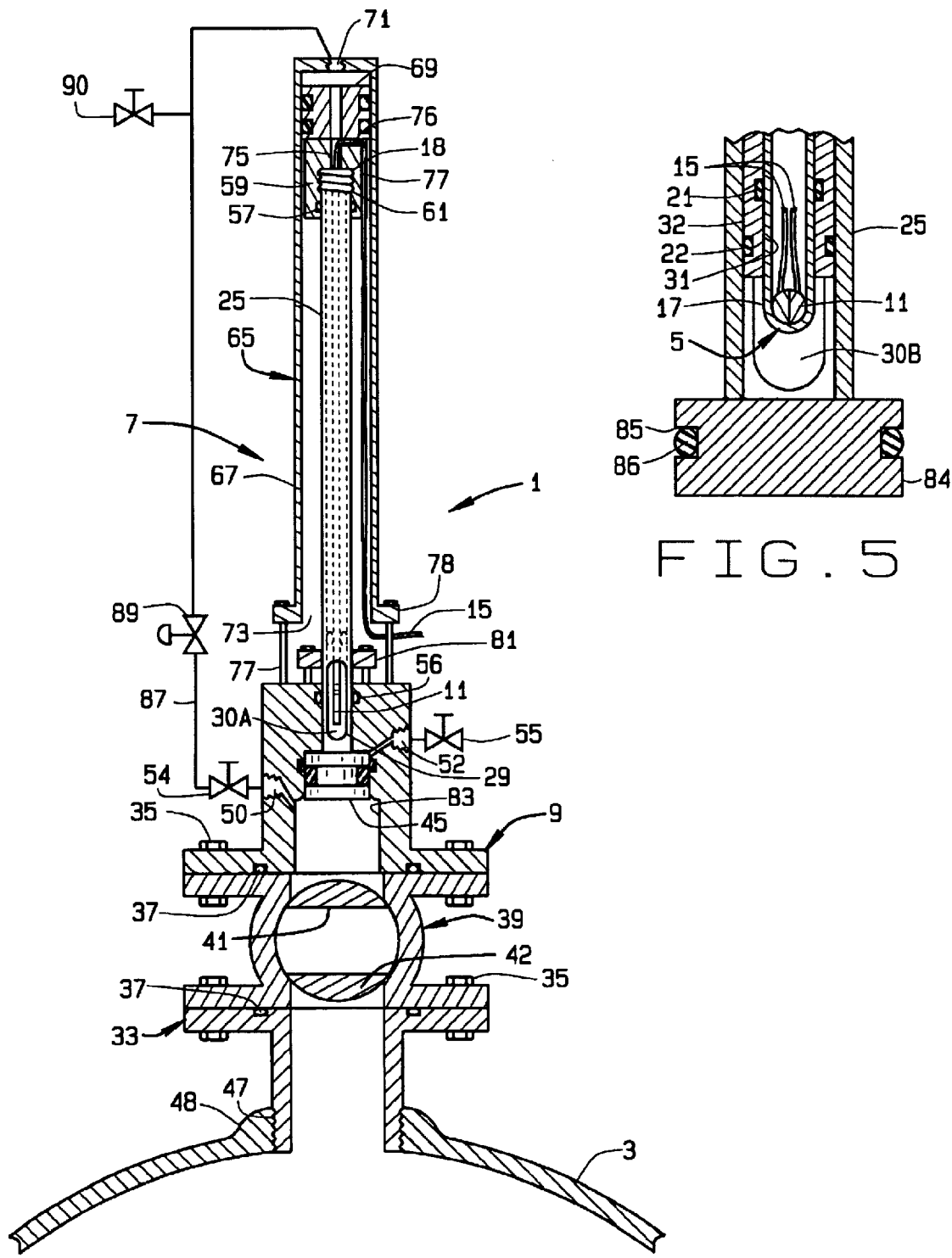

TEMPERATURE PROBE AND INSERTION DEVICE

BACKGROUND OF THE INVENTION

The present invention relates to an improved temperature probe for use in measuring or monitoring the temperature of fluid.

In the transporting of natural gas, which oftentimes comprises both gaseous components and liquid components, the natural gas is transported through a pipeline from a gas well or the like to a point of use or distribution. Irrespective of the size of such pipelines, they operate in substantially the same way. During the transporting of natural gas in pipelines, it has been found important to monitor certain variables regarding the condition of the natural gas. Monitored variables can include pressure, temperature, speed of flow and flow rate. These variables are important in order to determine not only the state of the natural gas, but the properties of the gas and its economic value. For example, its BTU value as delivered to a customer and the relative proportions of gaseous components to liquid components. The variables as measured, should provide as instantaneous and real time value for the variables as is practicable. This is particularly true when calculating the BTU value of the natural gas since natural gas is sold by its volume and BTU value (MMBtu). Even a small fraction of a percent in variation from the actual condition to the measured condition can equate to a potential significant decline in profits of the buyer or seller by failing to know the true BTU value of natural gas. The actual values are thus important for both buyer and seller with both oftentimes monitoring the natural gas and sometimes using an independent third party to monitor.

Many devices for monitoring variables, such as temperature and pressure of natural gas, are available from Welker Engineering of Sugar Land, Tex.

Much engineering work has gone into refining and improving the ability to monitor natural gas properties but improvements, even though minor in accuracy, are important in order to obtain more accurate information about the natural gas and hence its economic value. Further, durability and reliable functioning are important factors.

Two commercial temperature probes are Welker model AITP-1 F and Model AITP-1S. Both of these probes are of the automatic insertion type which allows for an operator to selectively have the temperature sensing probe inside the pipeline (extended), or outside of the normal gas flow path of the pipeline (retracted) in the event pigging is desired for the pipeline. The retraction of the probe allows a pig to move unimpeded through the pipeline as is known in the art. The temperature sensing probe includes a sensor with a sensing element, such as a thermocouple, enclosed within a closed carrier rod for movement into and out of the pipeline and to protect the sensing element. The sensor typically has the sensing element enclosed in a tubular housing. Such housings are generally small, e.g., $1/8$–$3/16$ inch in diameter and can be made of metal or plastic depending on the application. The inside dimension of the housing is approximately equal to the exterior size of the sensing element and there is preferably contact between the sensing element and housing to improve heat transfer and to reduce the temperature gradient. Enclosing the sensor within a closed end carrier seals the interior of the pipeline from the exterior of the pipeline in a simple and effective manner. The enclosing of the sensor in a carrier also provides needed durability and functionality. The flowing gas can be moving as fast as 200 ft/sec and sometimes faster. The natural gas can also have entrained liquid that can impact on the carrier possibly setting up vibrations or causing damage. Also, the probes can be very long for the section that extends into the pipeline. The exposed portion of the probe must have sufficient structural properties, e.g., resistance to bending to withstand the forces applied thereto. They must resist damage from the impinging liquid and must also be resistant to vibration that can damage and even break the probe. A thermocouple sensor is on its own not well adapted for use in a natural gas pipeline because of its size and strength. To solve these problems, the industry has enclosed the sensor completely in a carrier. Enclosing provides the advantages of sealing against leakage from the conduit interior to its exterior, strength and protection of the sensor. The use of an enclosed sensor was considered to be acceptable. However, increased measurement accuracy and responsiveness is desired while still achieving the goals of sensor protection and sealing the interior of the pipeline from the exterior of the pipeline.

With prior art devices, if maintenance is needed, a significant amount of disassembly or possibly shutting down the pipeline was required in order to effect maintenance. This is costly as well as time consuming and presents dangers should there be residual pressure in the line allowing the natural gas to escape when parts of the devices are removed. The positioning of temperature sensors in the flow stream is effected by having the sensor pass through an isolation valve that is used to selectively isolate the interior of the pipeline from the probe device when the sensing element is retracted. This requires a valve assembly that allows the valve element to be open for the sensing element to be extended through, retracted from and remain in the extended position. To do maintenance work on the probe or to pig the line, the sensing element is retracted past the isolation valve, after which the isolation valve is closed to allow work on the insertion device, sensing element and/or pipeline. However, given the construction of currently available probes and insertion devices, it is not possible to eliminate the isolation valve on a line unless one is willing to shut the line down in order to effect maintenance on or installation of a monitoring device after the pipeline is constructed except during down periods on the pipeline.

Another problem is the expense of providing the insertion devices for extending and retracting the sensing element. Automatic insertion devices are available in two basic forms. The first form of device involves the use of a permanently attached gas or liquid powered linear motion cylinder drive and the entire device is attached to the pipeline or the like. However, each probe has a drive, and the drives are seldom used, resulting in a relatively large investment in drives. The second form of automatic insertion device uses a removable gas or liquid powered linear motion cylinder drive allowing the drive to be used at multiple locations thereby reducing the investment in drives. An example of a permanently attached drive is a Welker Model AID-1. Examples of removable drives are Welker Models AID-2 and AID-3.

Therefore, there is a need for an improved insertion device and sensing probe.

SUMMARY OF THE INVENTION

The invention involves the provision of a sensing probe device with a drive and an insertable sensor such as a temperature probe for use in the measurement of a fluid variable in a conduit, e.g., a pipeline. The sensor includes a sensing element. The sensor is carried by a rod that is selectively insertible into a conduit and moveable between an extended position and a retracted position. When the sensor is in the extended position it is in the flow stream of the fluid flowing through the conduit.

In one aspect of the invention, the sensor is a temperature sensor with a sensing element such as a thermocouple. The sensor or sensing element is exposed directly to the fluid in the conduit. The sensing element is contained within a guard to provide protection and stabilization for the sensing element.

The present invention also involves the provision of an automatic insertion device utilizing a valve assembly and probe arrangement that permits removal of a sensing element while maintaining the interior of the conduit out of flow communication with the exterior of the conduit and allowing for easy disassembly of the drive that selectively extends and retracts the probe into and out of the flow stream in the conduit. The valve assembly may be used in combination with an exposed sensor.

BRIEF DESCRIPTION OF THE DRAWINGS

FIG. 1 is an end sectional view of a conduit and insertion device with a sensor probe shown in an extended position.

FIG. 2 is a sectional view taken along the line 2—2, FIG. 1 showing details of the sensing element and carrier.

FIG. 3 is a sectional view taken along the line 3—3, FIG. 1, showing additional details of the carrier and sensor device.

FIG. 4 is a sectional view similar to FIG. 1 showing the sensor probe in a retracted position.

FIG. 5 is an enlarged sectional view of the sensor probe and lower end of the carrier.

Like numbers designate like or similar parts throughout the drawings.

DETAILED DESCRIPTION

The reference numeral 1 designates generally an apparatus usable to monitor a variable relating to the condition of a fluid, such as natural gas, in a conduit 3 which may be a pipeline. Apparatus 1 includes a sensor (probe) device designated generally 5 and a drive designated generally 7 mounted on the conduit 3 and operable for selectively moving at least a portion of the sensor 5 to an extended position in a flow stream in the conduit 3. A connecting mechanism designated generally 9 is provided for mounting of the drive 7 on the conduit 3 and is preferably adapted for allowing removal of the drive 7 from the conduit 3 after installation.

As seen in FIGS. 1 and 2, the sensor 5 includes a sensing element 11. The sensing element 11 is preferably adapted to sense temperature of the fluid in the conduit 3 and enclosed within a rigid shield or housing 17 which is shown as a closed end tube. The sensing element 11, for example, can be a thermocouple that is mounted to a carrier designated generally 13. The illustrated carrier 13 includes an elongate tubular rod 25. Sensor 5 also includes leads 15 operable for carrying a signal from the sensing element 11 to a device (not shown) for recording and/or providing a readout for the sensed variable. Such devices are well known in the art. It is to be understood, however, that other types of sensors can be used with the drive 7. In one embodiment, the housing 17 may have a length sufficient to engage a cap 59 to prevent longitudinal movement of the sensor 5 within the interior of rod 25 under the influence of the pressurized fluid in the conduit 3. A shorter housing 17 may be provided as seen in FIGS. 1, 4. The housing 17 may be metal or plastic and when the sensing element 11 is a thermocouple, it is preferably in good heat transfer relationship therewith, as in direct contact or potted in place with a good heat transfer medium. Leads 15 extend through the housing 17 and exit out end 18 as seen in FIGS. 1, 4. The sensor 5 is mounted in the carrier 13 through an elongate longitudinal bore 19 in the rod 25. Preferably, sensor 5 is removably mounted within the carrier 13 and is sealed to the carrier 13 as for example by an O-ring 21 which is mounted in an internal groove 24 of a retainer 32 which is secured in the bore 19 as by friction, adhesive, mutual threaded engagement or the like and sealed to the rod 25 by an O-ring 22 (FIG. 5). The O-rings 21, 22 seal pressurized fluid in the conduit from flowing through the bore 19 along the length of the rod 25 and may frictionally retain the sensor 5 in position during use. A tool, not shown may be provided for installing the sensor 5 in the rod 25. The sensing element 11, which preferably includes a thermocouple, is comprised of an end of joined together dissimilar metals. The sensor 5, and generally its housing 17, is in direct contact with fluid within the conduit 3 when the sensor is in its extended position as seen in FIG. 1 and may be out of contact with the fluid when the sensor is in a retracted position as seen in FIG. 4.

One of the sensor 5 or sensing element 11 is exposed for direct contact with the fluid when the sensor 5 is in its extended position and is simultaneously provided with a guard 23 and means to control flow to the sensor or sensing element. In the illustrated structure, the guard 23 is part of the rod 25. Although the sensing element 11 or sensor 5 is in direct contact with the fluid, this does not mean that they cannot be protected with a coating of material, for example, to resist corrosion. The tubular rod 25 has a free end 26 and a drive end 27. Preferably, the free end 26 is hollow and is provided with a flow director such as a through port 29 which is formed by openings 30A and 30B as seen in FIGS. 1, 2, 4 and 5. Preferably, the rod 25, as best seen in FIG. 2, is in the form of a ring in transverse cross section and adapted to receive the housing 17 through a bore 31 in retainer 32. The seal 21 is preferably mounted in the interior of the retainer 32 and projects inwardly to sealingly engage the exterior of housing 17. Fluid in the flow path in conduit 3 contacts the sensor 5 or sensing element 11 by flowing through the openings 30A, 30B preferably avoiding appreciable compression and decompression of the fluid. The size, shape and orientation of the openings 30A, 30B may be used to control the flow of fluid over the sensor 5 or sensing element 11. Preferably, the openings 30A and 30B are generally in line with the direction of flow of fluid along the conduit 3. Alternatively, the free-end 26 of the rod 25 may be open and one of the openings 30A, 30B may be eliminated. In another alternative embodiment, the end 26 of the rod 25 may be open and both openings 30A, 30B may be eliminated with the end of the rod 25 having a cavity containing a portion of the sensor 5 and the sensing element 11.

The apparatus 1 is mounted to the conduit 3 by mounting a connector 33 to connector 9 as with a plurality of fasteners 35 such as flange bolts and nuts. A seal 37 such as an O-ring can be used to seal the connector 33 to connector 9. Shut off valve 39, which is referred to in the art as an isolation valve, is provided preferably between the connector 33 and connector 9 and includes a valve element 42 that when open allows the free end portion of the carrier 13 and a valve element 45 secured to the carrier 13 to pass therethrough to move between extended and retracted positions. An exemplary shut off valve 39 is a full ported ball valve from WKM Industries of Stafford, Tex. The valve 39 is optional. The connector 9 is mounted to the conduit 3, as for example, by a sealed and threaded engagement between an end 47 of the connector 9 and a threaded collar 48 such as a Thread-o-let® connector or flange mounted which are well known in the art.

The apparatus 1 includes valve element 45 secured, as by welding, to the free end 26 of the rod 25 as described above. The connector 9 also forms a valve body which when the carrier 13 is retracted, a port 52 is sealed as seen in FIG. 4 without requiring the closure of an auxiliary valve assembly 55 attached at the port 52 or closing of valve 39. The port 50 is in flow communication with the conduit 3 when the valve element 45 is in its extended and retracted positions allowing operation of the drive 7 whether the valve element 45 is in its extended or retracted position. The interior of conduit 3 is sealed from the exterior by seals 56 such as O-rings mounted in base connector 33 and sealingly engaging the exterior of rod 25. The bore 19 may also be sealed from the exterior of the conduit 3 via a seal member 57 mounted in the cap 59 adjacent the drive end 27. The rod 25 is secured to the cap 59 as by threaded engagement at 61. Thus, movement of the cap 59 by a piston 69 will effect movement of the carrier 13 with rod 25 between the extended and retracted positions as described below.

The drive 7 is operable to effect movement of the carrier 13, sensor 5 and sensing element 11 between extended and retracted positions into and out of the flow stream within the conduit 3. Such drives are referred to in the art as an automatic insertion device such as those available from Welker Engineering. Typical of these are models AID-1, AID-2 and AID-3. Any suitable drive may be used, however, the drive shown is particularly suited for the present invention and is well adapted for maintenance of the apparatus 1 and in particular changing of a sensor 5 without major disassembly. As shown, the drive 7 includes an open ended fluid activated cylinder designated generally 65. The cylinder 65 includes a generally cylindrical housing 67 having a moveable piston 69 therein. The piston 69 is moveable in a vertical direction, as seen in FIGS. 1, 4 or longitudinally along the length of the housing 67. The housing 67 is ported at 71 for a supply of pressurized fluid which is preferably obtained from the conduit 3. Pressuring of the back side of the piston 69 (closed end of the housing 67) will effect downward movement of the piston 69 and consequently the carrier 13 to its extended position in the conduit 3. By relieving the pressure on the backside of the piston 69, the pressure of the fluid within the conduit 3 will move the carrier 13 to its retracted or up position by applying a longitudinal force to the carrier 13. The cap 59 and carrier 13 also move longitudinally within the housing 67 during movement of the sensor 5 between its extended and retracted positions. Preferably, the housing 67 has an open end 73 which allows for easy removal of the housing 67 from the cap 59 and carrier 13. By removing the cap 59 from the rod 25 the sensor 5 may be removed from the rod 25 and repaired or replaced while the valve element 45 effects isolating the remainder of the apparatus 1 from the interior of the conduit 3. The leads 15 as seen in FIGS. 1, 3, 4 and 5 extend through a bore 75 and are retained within grooves 76, 77 to permit them to extend out of the open end 73 (when the drive 7 remains mounted to the conduit 3) for connection to monitoring equipment. By being positioned within grooves 76, 77, the leads 15 will not interfere with movement of the cap 59 and piston 69. The leads 15 may be also positioned otherwise than within the grooves 76, 77 but by having the leads 15 and housing 17 pass completely through the rod 25 replacement and maintenance of the sensor 5 is facilitated. It is to be understood however that the rod 25 and sensor 5 may be an integrated unit and replaced as an integrated unit instead of just replacing the sensor 5. The housing 67 is secured to the connector 9 as for example by fasteners 79 extending through a flange 78 for threaded engagement in bores (not shown) in a flange 80. Also, the cylinder 65 may be removed from the apparatus 1 and used elsewhere and then reinstalled when it is desired to move the carrier 13 between positions. This may be easily accomplished by separation of the housing 67 from the flange mount 80. The rod 25 may have its motion to move to the extended position halted and may be held in its extended position by use of a lock collar 81 which may selectively be secured to the connector 9. It may be desirable to lock the carrier 13 in any extended or retracted position if the drive 7 is to be removed. The connector 9 includes ports 50, 52. Retraction of the rod 25, sensor 5 and sensing element 11 is limited by the valve element 45 engaging a wall 82. The valve 55 would be closed during normal operation and can be used to exhaust gas contained above the valve element 45 in a chamber 83. As seen in FIG. 5, the valve element 45 is in the form of a piston and has a generally cylindrical side surface 84 with an outwardly opening peripheral groove 85 therein. A seal member 86 such as an O-ring is received in the groove 85 for selective sealing engagement with a side wall 87 of the chamber 83. The seal 86 is engageable with the side wall 87 forming a seal between the side wall 87 and the valve element 45 when the valve element 45 is in its retracted position as seen in FIG. 4. Both the valve element 45 and chamber 83 are generally cylindrical thus eliminating the need for relative orientation. Thus, the valve element 45 with seal 86 cooperates with the side wall 87, which is a valve seat, to form a valve. The seal formed by the valve element 45 and side wall 87 in one embodiment is downstream of the opening(s) exposing the sensor 5 or sensing element 11 when the valve element is in the retracted position to seal the interior of conduit 3 therefrom. Additionally, the valve element 42 may also be in a closed position to prevent escape of fluid from the conduit 3 when rod 25 is in the retracted position.

The cylinder 65 is provided with pressurized fluid from the conduit 3. A valve 54 is used to selectively permit flow of fluid from the conduit 3 to the housing 67 on the backside of piston 69. Pressurizing the backside of piston 69 in the housing 67 will move the carrier 13 to its extended position. Opening of the valve 54, with the connector 9 being ported as seen in FIGS. 1, 2, allows gas to flow through the port 50 to flow through a conduit 91 which is connected to the chamber in the housing 67 on the backside of the piston 69 thus driving the carrier 13 to its extended position. As described above, the lock collar 81 may be also used as an extension stop for movement of the cap 59 and hence the piston 69 limiting extension movement of the carrier 13. A pressure regulator 89 may also be used in conduit 91. An exhaust valve 90 may be provided to vent the pressurized backside of the cylinder 65 to atmosphere which would allow carrier 13 to move to its retracted position in the event the collar 81 is not retaining the rod 25 in the extended position. It is preferred however to maintain the rod 25 in the extended position by use of the collar 81 and not pressure on the backside of the cylinder 65.

In operation, the apparatus 1 is installed on the conduit 3 by connection to the connector 33. The backside of the cylinder is pressurized after the valve element 42 is moved to the open position such that the rod 25 and sensing element 11 are moved to the extended position inside the conduit 3. The cylinder 7 may be removed after tightening of the collar 81 and utilized in other systems. When it is desired or necessary to do maintenance work on the sensor 5 or the apparatus 1, the drive 7 may be reinstalled if it is not already installed and the collar 18 loosened to allow the rod 25 to move upwardly under the influence of the pressure of the fluid in the conduit 3. If desired, the valve 55 may be opened to relieve the pressure on the top side of the valve element 45 and preferably after the valve 42 is closed to prevent escape of fluids from the conduit 3. The valve 90 would need to have been opened to allow exhausting of the fluid contained on the backside of the piston 69 in the housing 67. To do maintenance, the housing 67 is removed exposing the cap 59. The cap 59 may be removed from the rod 25 to allow extraction of the sensor 5 from the rod 25 for maintenance or replacement.

Thus, there has been shown and described several embodiments of a novel invention. As is evident from the foregoing description, certain aspects of the present invention are not limited by the particular details of the examples illustrated herein and it is therefore contemplated that other modifications and applications, or equivalents thereof, will occur to those skilled in the art. Many changes, modifications, variations and other uses and applications of the present constructions will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A sensor device for sensing a variable in a conduit, said device including:
   a sensor with a sensing element operable to sense a variable in the conduit;
   a carrier with the sensing element mounted thereon;
   a base adapted for mounting on a source of fluid, said carrier is movably mounted on said base;
   a drive operably connected to the carrier and operable to selectively move the sensing element to an extended position in the source of fluid;
   a valve seat associated with the base; and
   a valve element carried by the carrier and movable therewith, the valve element is operable to engage said valve seat when the sensing element is in the retracted position to selectively prevent flow of fluid from the source out of the sensor device when the sensing element is in a retracted position.

2. A device as set forth in claim 1 wherein the drive includes a fluid operated piston cylinder.

3. A device as set forth in claim 2 wherein the cylinder includes an open end.

4. A device as set forth in claim 3 wherein the carrier extends through the open end.

5. A device as set forth in claim 4 wherein the carrier includes an elongate rod with opposite first and second ends, the first end may be positioned in a chamber within the cylinder and the second end is outside the chamber and adapted for positioning in the source, said valve element is secured to the rod adjacent the second end.

6. A device as set forth in claim 5 wherein the valve element includes a first piston and said sensing element is positioned between a free end of the first piston and the first end of the rod.

7. A device as set forth in claim 6 wherein the body includes a generally cylindrical first chamber defined by a sidewall, said first piston is receivable in the first chamber and said first chamber sidewall forms at least a portion of the valve seat.

8. A device as set forth in claim 7 wherein the first piston includes a seal member in a peripheral groove in an exterior sidewall of the first piston, said seal member is engageable with the sidewall of the first chamber forming a seal between the first chamber sidewall and the first piston.

9. A device as set forth in claim 5 wherein the rod is tubular with an interior channel opening onto the first end of the rod, the sensor device is removably received in the channel.

10. A device as set forth in claim 9 includes a cap removably secured to the first end of the rod and moveably received in the cylinder, said cylinder includes a second piston moveable therein and operable to move the cap and rod to an extended position.

11. A device as set forth in claim 10 wherein the cylinder is removably mounted on the base and upon removal the cap passes through the open end of the cylinder exposing the cap and the first end of the rod allowing removal of the sensor therefrom.

12. A device as set forth in claim 11 including a lock device associated with the rod and the base to selectively lock the rod in an extended position.

13. A sensor device for sensing a variable in a conduit, said device includes:
   a sensor with a sensing element operable to sense a variable in the conduit;
   a carrier with the sensing element mounted thereon;
   a base adapted for mounting on a source of fluid, said carrier is movably mounted on said base;
   a drive operably connected to the carrier and operable to selectively move the sensing element from a retracted portion to an extended position in the source of fluid;
   a valve seat associated with the base; and
   a valve element carried by the carrier and movable therewith, the valve element is operable to engage said valve seat when the sensing element is in the retracted position to selectively prevent flow of fluid from the source out of the sensor device when the sensing element is in a retracted position.

* * * * *